US006826535B2

(12) United States Patent
Wood et al.

(10) Patent No.: US 6,826,535 B2
(45) Date of Patent: *Nov. 30, 2004

(54) METHOD FOR REDUCING FRAUD IN HEALTHCARE PROGRAMS USING A SMART CARD

(76) Inventors: Richard Glee Wood, 4627 Cashel Cir., Houston, TX (US) 77069; Wesley Jack White, Jr., 6219 Squires Ct., Spring, TX (US) 77389

( * ) Notice: Subject to any disclaimer, the term of this patent is extended or adjusted under 35 U.S.C. 154(b) by 2 days.

This patent is subject to a terminal disclaimer.

(21) Appl. No.: 10/428,609

(22) Filed: May 2, 2003

(65) Prior Publication Data

US 2004/0204960 A1 Oct. 14, 2004

Related U.S. Application Data

(60) Provisional application No. 60/461,225, filed on Apr. 8, 2003.

(51) Int. Cl.[7] .............................................. G06F 17/60
(52) U.S. Cl. .............................................. 705/2; 705/4
(58) Field of Search ............................. 705/2, 3, 4, 1; 902/26

(56) References Cited

U.S. PATENT DOCUMENTS 5,884,271 A * 3/1999 Pitroda ........................... 705/1
6,012,035 A * 1/2000 Freeman et al. ............... 705/2
6,208,973 B1 * 3/2001 Boyer et al. ................... 705/2

FOREIGN PATENT DOCUMENTS

WO WO 01/04821 A1 * 1/2001 ........... G06F/17/60

OTHER PUBLICATIONS

DeBow, Credit card companies: Giving first aid to health-card processing systems, Feb. 1994, Bank Systems & Technology, vol. 31 No. 2, pp. 24–26.*

* cited by examiner

Primary Examiner—Joseph Thomas
Assistant Examiner—Christopher L. Gilligan
(74) Attorney, Agent, or Firm—Wendy Buskop; Buskop Law Group, P.C.

(57) ABSTRACT

The invention is a method for reducing fraud in a healthcare program by registering a service provider with a private healthcare provider and issuing a service provider identification codes, registering at least one service of the service provider with the private healthcare provider and identifying a claim code for each registered service; issuing a smart card to an individual related to a benefits program of the private healthcare provider wherein the individual has an identification code and the smart card has a feature to identify the individual; using the smart card to determine if the individual is the authorized card bearer and is eligible for the healthcare program; using the smart card to determine if a service provider is preauthorized to provide a registered product under the private healthcare provider program; and using the smart card to facilitate a transmission between the service provider and the private healthcare provider.

13 Claims, 6 Drawing Sheets

500

Medical Security
SMART CARD

John Doe 3390 01 12 334 309

XYZ Medical Insurance

Insta-Pay or Express-Pay

Emergency Information

*FIG. 6*

METHOD FOR REDUCING FRAUD IN HEALTHCARE PROGRAMS USING A SMART CARD

The present application claims priority from Pending Provisional Patent Application Ser. No. 60/461,225 titled "METHOD FOR REDUCING FRAUD IN HEALTHCARE PROGRAMS USING A SMART CARD," filed in the U.S. Patent and Trademark Office, on Apr. 8, 2003.

FIELD OF THE INVENTION

The present invention relates to a method for reducing fraud in healthcare programs using a smart card that contains identification, security measures, and other information to facilitate the transfer of funds and eliminate fraud in the benefit.

BACKGROUND OF THE INVENTION

Providers of benefits from private healthcare providers have had concerns wherein individuals could "double dip" in private healthcare provider programs, or service providers could inadvertently "double bill" or inappropriately bill for services rendered.

In addition, proper service and goods providers for healthcare program have had to wait long periods of time to get paid for their services or goods rendered to the eligible employee. This situation has become tedious and causes benefit costs to be very high, reducing overall benefits available, due to these fraud issues.

A need has long existed for a system, wherein the private healthcare provider advances funds to pay for services of a service or goods provider so that an eligible individual does not have to handle money.

This need has been particularly great for incapacitated individuals, such as those in nursing homes, who are no longer able to handle funds or complicated transactions, to have a system wherein a private healthcare provider benefit can be provided properly to a health care provider or similar benefits provider in a timely manner with payment to the provider.

A need exists for a method to reduce the magnitude of transaction costs involved in reviewing and adjudicating payment requests to a private healthcare provider that would have the effect of reducing the rate of increase of private healthcare provider benefit costs, or enable more benefits to be provided to more people.

A need exists to reduce the traditionally high cost of benefits administration, including the review and adjudication of payment requests which results from benefit service or goods providers having to act as "banks" or "credit sources" for individuals eligible for the benefit.

Methods and apparatus exist to attempt to streamline the insurance claim payment process, such as the method disclosed in U.S. Pat. No. 6,163,770. This patent revealed using a digital electrical apparatus to generate output for insurance documentation for a first insurance policy having a first risk and claims while revealing a concurrent second insurance policy for a second risk, wherein the second risk is different from the first. The processor of this method is connected to a memory device for storing and retrieving operations including machine-readable signals in the memory device, to an input device for receiving input data and converting the input data into input electrical data, to a visual display unit for converting output electrical data into output having a visual presentation, to a printer for converting the output electrical data into printed documentation, wherein the processor is programmed to control the apparatus to receive the input data and to produce the output data by steps including: inputting actuarial assumptions defining the first insurance policy; and computing a value of a specific financial attribute of the first insurance policy; the method further including the step of inserting the value of the financial attribute in the first insurance policy and other printed documentation related to the first insurance policy. However, this method did not apply to private healthcare provider programs in a simple and direct manner, as with the present system which was designed to meet these needs.

SUMMARY OF THE INVENTION

The present invention provides a method for reducing fraud in healthcare programs.

The method involves registering a service or goods provider with a private healthcare provider and issuing a service provider identification code to that provider. Services and goods of the provider can be registered with the private healthcare provider and claim codes would correspond with each registered service.

The method involves using a smart card, which is issued to an individual eligible for a healthcare program of a private healthcare provider. The smart card is used to determine if the individual is the authorized bearer of the card and if the individual is eligible for benefits from the healthcare program. The card is then used to facilitate three transmissions between the service provider to the private healthcare provider by providing relevant information about proposed goods and services, information about the individual and information about accelerating payment for the program.

More specifically, the invention is a method for reducing fraud in a healthcare program. The method entails registering a service provider with a private healthcare provider and issuing a service provider identification code and registering at least one service or at least one good of the service provider with the private healthcare provider and identifying a claim code for each registered service or registered good. Next, the method continues by issuing a smart card to an individual related to a healthcare program of the private healthcare provider wherein the individual has an individual identification code and the smart card has a smart card identification feature to identify the individual; using the smart card to determine if the individual: is the authorized bearer of the card; and is eligible for benefits from the healthcare program.

The smart card is used to determine if a service provider is preauthorized to provide a registered product or registered service under the healthcare program. In addition the smart card is used to facilitate a first transmission from the service provider to the private healthcare provider. The first transmission includes the service provider identification code, the individual identification code, proposed product information for the individual, and proposed service information for the individual. The first transmission also contains corresponding claim codes for the proposed product, corresponding claim codes for the proposed service, a request to confirm: the individual's eligibility for benefits under the healthcare program, a validation that the proposed good or service is approved for the individual, the service provider's eligibility to render services or provide goods under the healthcare program, and a request to participate in an accelerated payment program for the proposed good or the proposed service.

In the method the smart card is used to facilitate a second transmission from the private healthcare provider to the service provider, wherein the second transmission comprises: the individual's eligibility for benefits under the healthcare program; a validation that the proposed good or proposed service is approved for the individual; a validation of the service provider's eligibility to render services under the healthcare program; a confirmation that an accelerated payment program is available; and an authorization code to provide the proposed product and/or proposed service.

The smart card is used to facilitate a third transmission from the service provider to the private healthcare provider, wherein the third transmission comprises: a list of claim codes for services rendered; acknowledgement by the individual that information on the product and/or service was provided to the individual; acknowledgement that the product and/or service has been received from the service provider; and a request for accelerated payment by the private healthcare provider to the service provider.

BRIEF DESCRIPTION OF THE DRAWINGS

The present invention will be explained in greater detail with reference to the appended Figures, in which:

FIG. 6 is a picture of a smart card.

Figure 1:
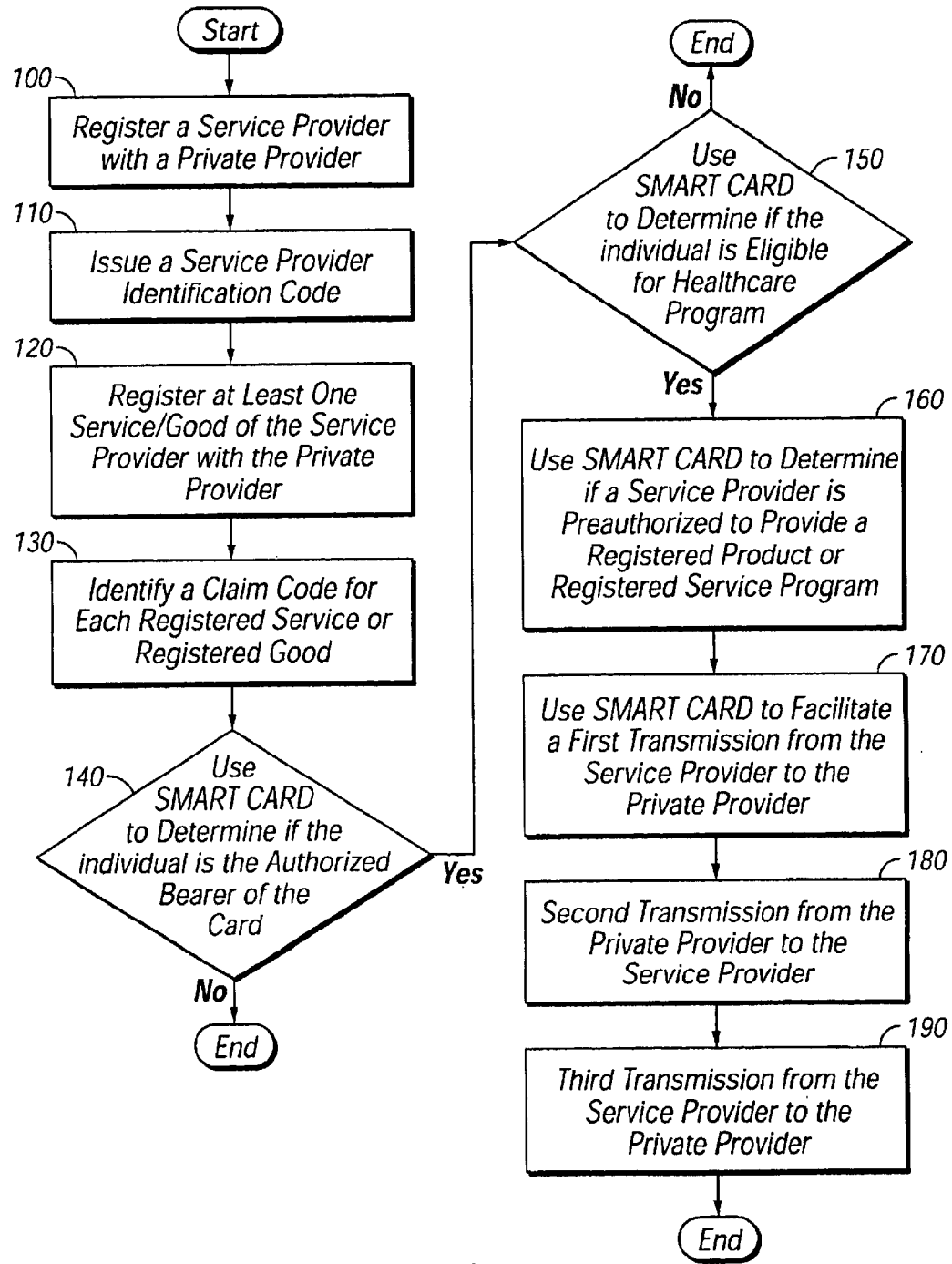
FIG. 1 is a diagrammatic representation of the overall method of the invention.

The present invention is detailed below with reference to the listed Figures.

DETAILED DESCRIPTION OF THE PREFERRED EMBODIMENTS

Before explaining the present invention in detail, it is to be understood that the invention is not limited to the particular embodiments herein and it can be practiced or carried out in various ways.

The invention relates to a method for accelerating the providing funds to a service or goods provider from a private healthcare provider, such as a federal, state or municipal private healthcare provider using a smart card.

This invention relates to the provision of a private sector benefit using a plastic card with a chip in it or a plastic card with a magnetic strip. The chip or strip can contain information on an individual, the benefit plan applied for, and other related information. It is contemplated that a plastic smart card could be used with a magnetic strip containing key information without requiring a chip or with both a chip and a magnetic strip.

The invention advantageously reduces fraud on the private sector by providing a safe method of pre-authorizing users for benefits prior to rendering the benefit.

The invention also advantageously avoids ineligible users from using services for which they are not authorized. The invention safe guards the government from users attempting to apply for the same service more than once, in other words "double dipping".

The first step of the method involves of: registering a service provider with a private healthcare provider and issuing a service provider identification code. Next at least one service or at least one good of the service provider is registered with the private healthcare provider and a claim code corresponds to each registered service or registered good A smart card is issued to an individual and is tied or otherwise related to a particular healthcare program of the private healthcare provider such as to the food stamp program of the State of Texas. In this situation, the individual has an individual identification code and the smart card has a smart card identification feature to identify the individual, such as through a biometrics device, like a fingerprint reader or a retinal reader.

A service provider or goods provider can use the smart card to determine if the individual is the authorized bearer of the card and is eligible for benefits from the healthcare program for which the service or goods provider can be compensated.

The smart card can also be used to determine if a service or goods provider is preauthorized to provide a registered product or registered service under the healthcare program Next the smart card is used to facilitate a first transmission from the service provider to the private healthcare provider, wherein the first transmission is a service provider identification code, the individual identification code described above, and certain proposed information.

The proposed information can be proposed product information for the individual; proposed service information for the individual; corresponding claim codes for the proposed product; and corresponding claim codes for the proposed service.

The first transmission preferably includes a request to confirm the individual's eligibility for benefits under the healthcare program; a validation that the proposed good or service is approved for the individual; the service provider's eligibility to render services or provide goods under the healthcare program; and a request to participate in an accelerated payment program for the proposed good or the proposed service The smart card can be used to facilitate a second transmission from the private healthcare provider to the service provider. The second transmission includes the individual's eligibility for benefits under the healthcare program, a validation that the proposed good or proposed service is approved for the individual, a validation of the service provider's eligibility to render services under the healthcare program, a confirmation that an accelerated payment program is available, and an authorization code to provide the proposed product and/or proposed service.

The smart card can facilitate a third transmission from the service provider to the private healthcare provider. The third transmission includes a list of claim codes for services rendered, an acknowledgement by the individual that information on the product and/or service was provided to the individual, an acknowledgement that the product or service has been received from the service provider, and a request for accelerated payment by the private healthcare provider to the service provider.

Typically, the smart card is created for the individual but one card could be created for a group of individuals.

For the chip version of the smart card, the card is first manufactured in a conventional manner, and then the relevant information is downloaded from the computers of the private healthcare provider to the card. For a non-chip version of a smart card, the card manufacturer would be provided information about the individual from the private sector and embed the relevant information in the magnetic strip and then mail or transfer the magnetic strip card to the user.

The individual can be the primary individual, another individual, a spouse, at least one dependent, such as one or more children, or it can be combinations of these.

The smart card can contain information about benefits for which an individual is eligible and an identification code, such as a "PIN" or other type of identification such as retinal or biometric identification means.

The smart card is preferably an electronically readable card that can connect to a computer of the private healthcare provider, such as via the Internet or telephone line. The card is contemplated to contain information on at least one or more of the following:

a. individual name (example—Richard Wood);
b. individual address (example—2396 Wood Street, Houston, Tex. 77019);
c. individual phone number (example—713-323-5555);
d. individual fax number (example—713-323-5554);
e. individual email address (example—Wood@aol.com);
f. private healthcare provider name and/or private sector administrator name (example—Mary Jones, Supervisor of the Food Stamp Program);
g. private healthcare provider address;
h. private healthcare provider phone number (example—281-873-8682);
i. private healthcare provider fax number;
j. private healthcare provider e-mail;
k. private healthcare provider's website;
l. private healthcare provider claims representative;
m. type of benefit plan or plans;
n. individual benefit number (example—Group 200116289.);
o. individual group number or group plan number (example—KLINASD);
p. individual's co-pay amount (example—$25);
q. individual's benefit history;
r. instructions (example—benefits instructions embedded in the card);
s. other phone numbers;
t. issue date or "validity" date;
u. an expiration date or "expiry date";
v. statements as to ownership of the card;
w. statements as to eligibility of the holder as to the rights of the card and the existence of written agreements related to the card; and
x. disclaimers concerning use, misuse, and revocation of the card.

The smart card can be used to obtain information on funds which are available from the private healthcare provider for a completed authorized social service for a particular individual. The card can obtain information on the typical payment schedule for a particular social service. Generally, the phrase "completed authorized benefit" is considered to be a service that has been authorized by contract by the private healthcare provider and rendered to the beneficiary of the benefit.

The accelerated fund payment schedule is a 100% payment schedule or a partial accelerated fund payment schedule depending on the contract with the private healthcare provider. It is contemplated that the funds would move electronically from the private healthcare provider's bank account to the service provider's bank account, such as by wire transfer, or normal electronic banking procedures.

Additionally, the smart card can be used to obtain information about the various benefit plans held by the individual and of the individual use of one plan, and whether other plan benefits should be denied.

In the method, the smart card is used to determine if the individual is eligible for accelerated provision of funds from the private healthcare provider to a service provider for benefit.

The smart card is used to not only contain the information described above, but to link to the private healthcare provider's database and between the private healthcare provider's database and the service provider's database and the service provider's bank account. The smart card facilitates a first transmission from the service provider to the private healthcare provider. This first transmission can include information on:

i. determination that the card is valid and the individual is eligible;
ii. determination that the service provider is authorized to provide the service;
iii. proposed benefit costs;
iv. information on benefit; and
v. an acknowledgement that at least one benefit has been rendered from the service provider to the individual.

The smart card facilitates the receipt of a second transmission from the private healthcare provider to the service provider. This second transmission can contain information on any amount of payment required by the individual. The amount of payment can be all or part of a co-payment fee, all or part of a deductible fee and combinations of these fees.

The smart card facilitates a third transmission to the private healthcare provider from the service provider. This third transmission would include an acknowledgement that the amount of the co-payment and the deductible has been paid by the individual to the service provider thereby initiating payment by the private healthcare provider.

It should be noted that in the context of this invention, the private healthcare provider is considered an entity that has been authorized by the federal private healthcare provider.

Additionally, the private healthcare provider, as a step in the process, must make contracts with various service providers that can be linked to the smart card.

The method involves that on approximately the same day that the third transmission is received by the private healthcare provider, or perhaps a few days later such as between 1 and 21 days, funds are then transmitted from the private healthcare provider to the service provider for benefits provided to the individual. This accelerated payment plan is a vast improvement over known systems that take up to eight months to pay a service provider.

This method contemplates that a benefit can be service related to a health procedure or eye glass prescriptions, dental examinations, dental procedures, mental health procedures, mental health therapies, physical therapy, podiatrists, doctor's visits, hospital visits, out-patient visits, and food stamps, housing, or other benefits This method contemplates that the smart card can be used to determine if a second opinion is required by the private healthcare provider for the benefit.

Now and with reference to the Figures, FIG. 1 shows a diagram of the overall invention.

First, a service provider is registered with a private healthcare provider (100) and the service provider is given an identification code is (110). Next, at least one service or good of the service provider is registered with the private healthcare provider (120) and a claim code is given for the given registered service or good (130).

The smart card is, then, used to determine if the individual is the authorized bearer of the card (140) and if the individual is eligible for the benefit of the healthcare program (150).

The smart card is used using the smart card to facilitate a first transmission from the service provider to a program administrator (170) for a private healthcare provider.

Figure 2:
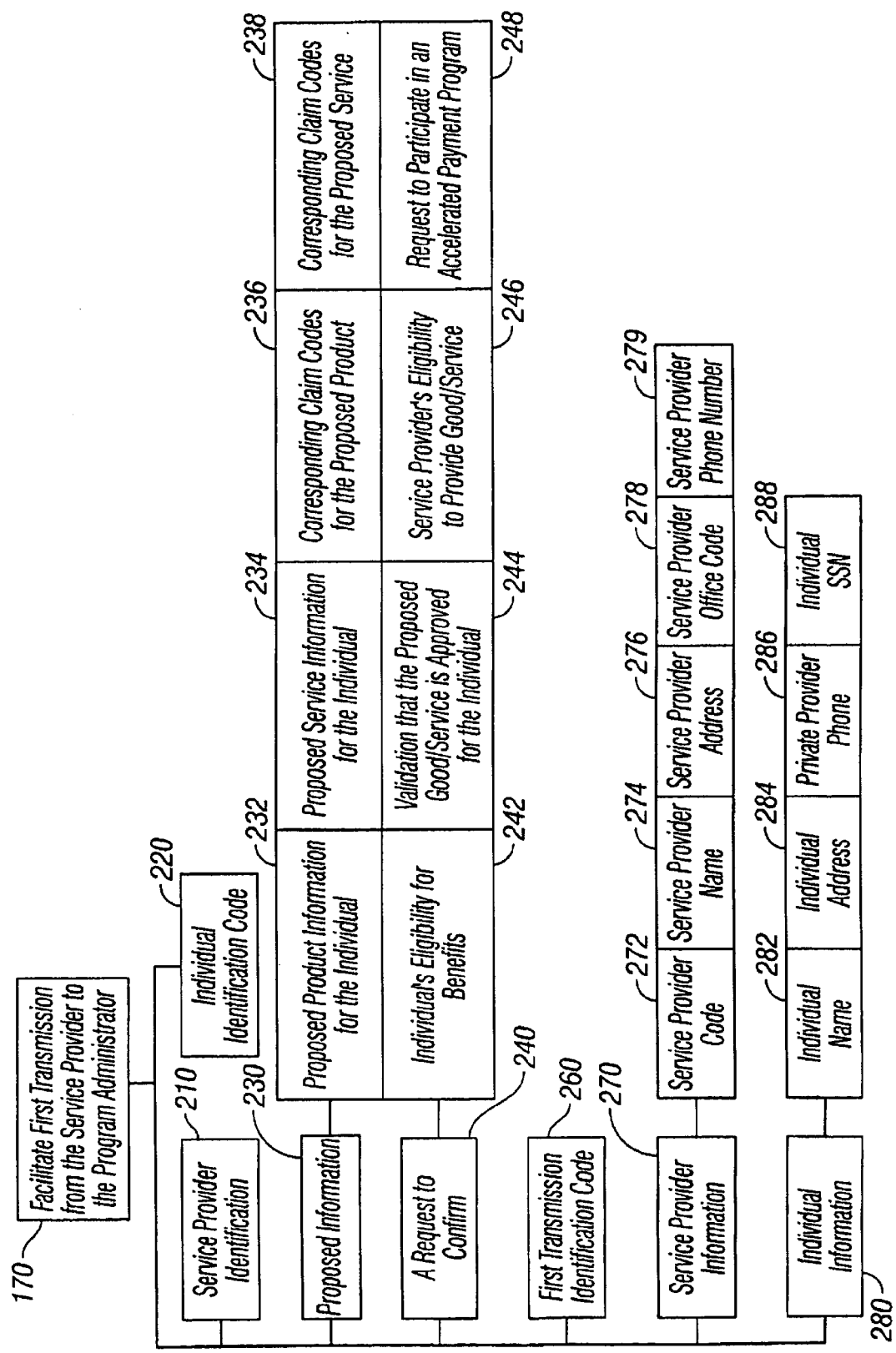
FIG. 2 is a diagrammatic representation of the first transmission.

As shown in FIG. 2, the first transmission (170) includes service provider identification (210), individual identification code (220), proposed information (230), and a request to confirm (240). The proposed information (230) involves proposed product information for the individual (232), proposed service information for the individual (234), corresponding claim codes for the proposed product (236), and corresponding claim codes for the proposed service (238). The request to confirm (240) entails validation that individual's eligibility for benefits (242), the proposed good/service is approved for the individual (244), service provider's eligibility to provide good/service (246), and request to participate in an accelerated payment program (248).

The first transmission (170) can further include a first transmission identification code (260); service provider information (270); and individual information (280). Examples of service provider information (270) are service provider code (272), service provider name (274), service provider address (276), service provider office code (278), and service provider phone number (279). Examples of individual information (280) are individual name (282), individual address (284), private healthcare provider phone (286), and individual social security number (288), and combinations of these.

Referring back to FIG. 1, the smart card is used to facilitate a second transmission from the private healthcare provider to the service provider (180).

Figure 3:
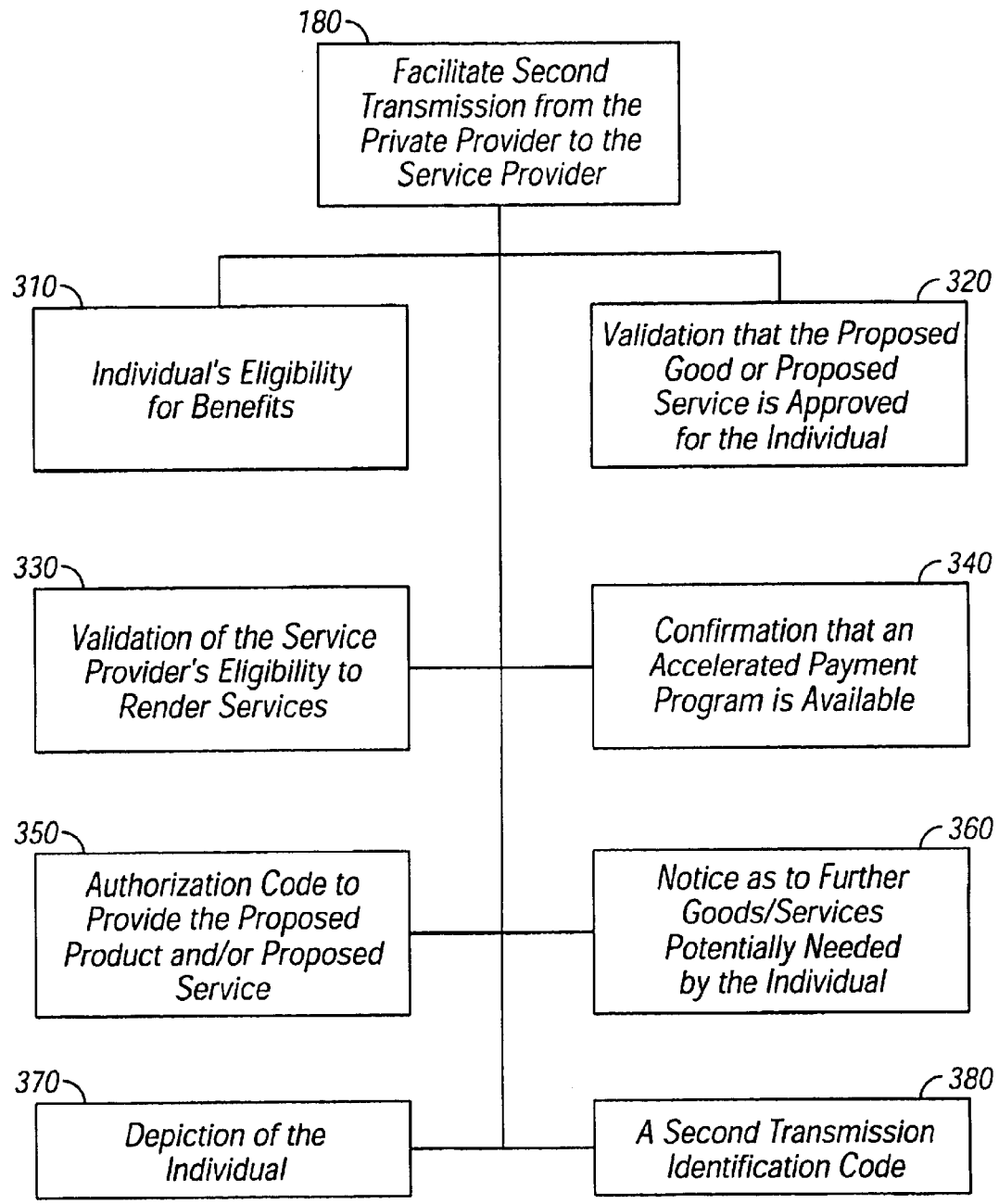
FIG. 3 is a diagrammatic representation of the second transmission.

As shown in FIG. 3, the second transmission (180) includes individual's eligibility for benefits under the healthcare program (310), validation that the proposed good or proposed service is approved for the individual (320), validation of the service provider's eligibility to render services under the healthcare program (330), confirmation that an accelerated payment program is available (340), and authorization code to provide the proposed product and/or proposed service (350).

The second transmission (180) can also include notice as to further goods/services potentially needed by the individual (360), depiction of the individual (370), a second transmission identification code (380), and combinations thereof.

Referring back to FIG. 1, the smart card, next, is used to facilitate a third transmission from the service provider to the private healthcare provider (190).

Figure 4:
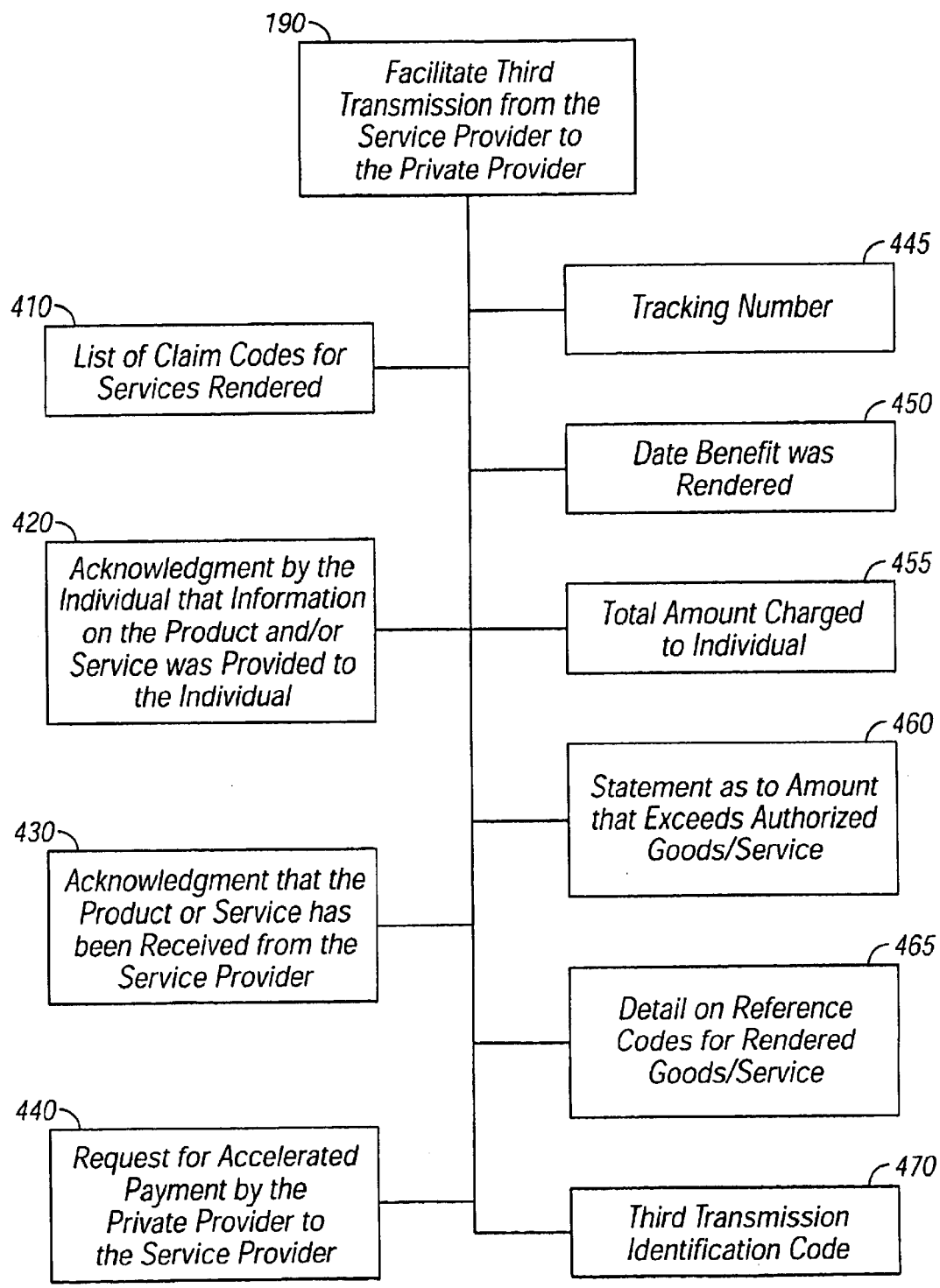
FIG. 4 is a diagrammatic representation of the third transmission.

The third transmission (190), shown in FIG. 4, involves list of claim codes for services rendered (410), acknowledgement by the individual that information on the product and/or service was provided to the individual (420), acknowledgement that the product or service has been received from the service provider (430), and request for accelerated payment by the private healthcare provider to the service provider (440).

On approximately the same day that the third transmission is received by the private healthcare provider, funds are transmitted from the private healthcare provider to the service provider (180) for the product and/or service provided to the individual.

The third transmission (190) can also involve a tracking number (445); date benefit was rendered (450); total amount charged to individual (455); statement as to amount that exceeds rendered benefit (460); detail on reference codes for rendered benefit (465); a third transmission identification code (470); and combinations thereof.

Figure 5:
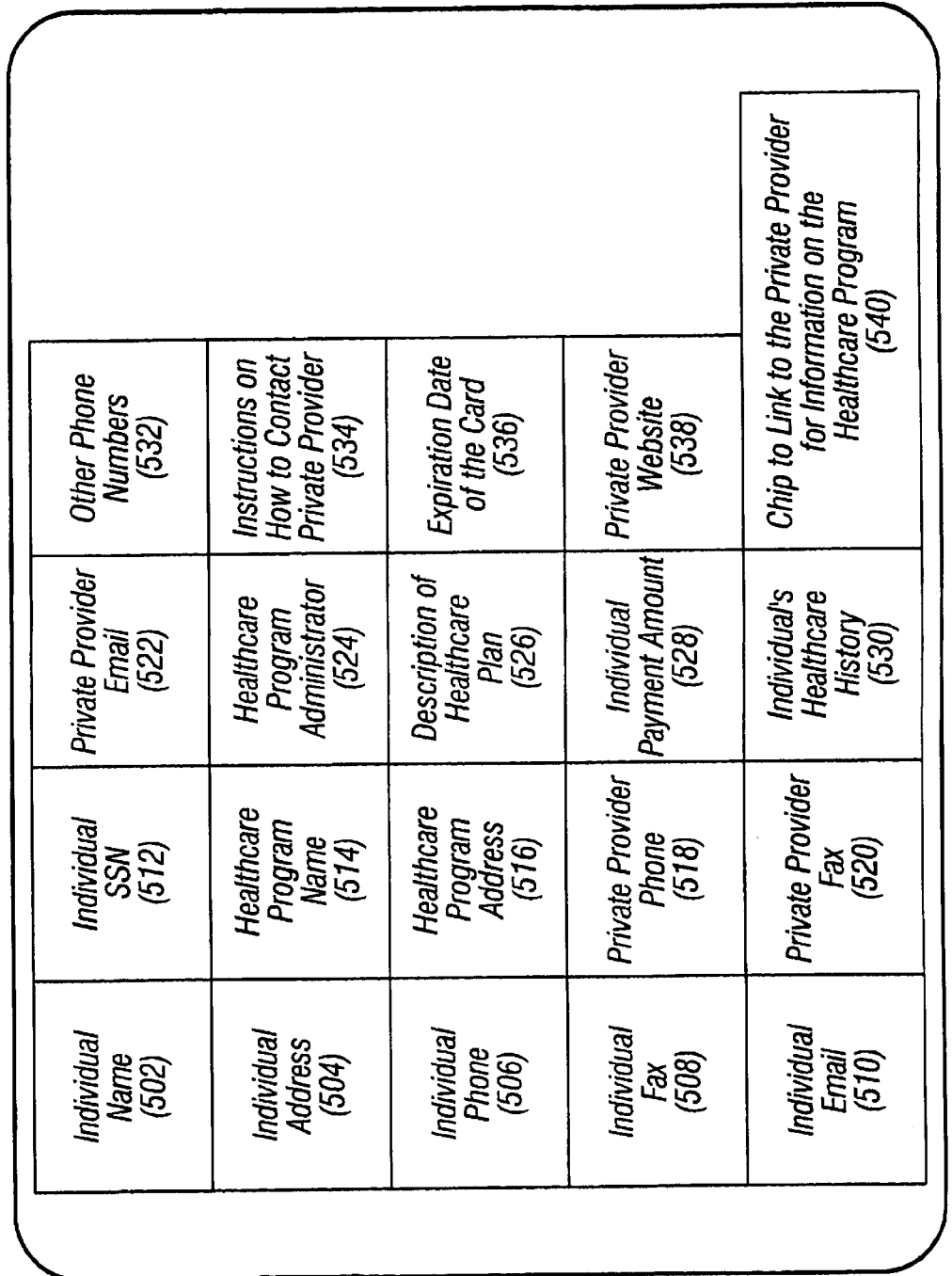
FIG. 5 is a diagrammatic representation of a smart card usable in the invention.

FIG. 5 shows a smart card (500) that is contemplated as within the scope of the invention. The smart card is an electronically readable card containing individual name (502); individual address (504); individual phone number (506); individual fax number (508); individual email address (510); individual social security number (512); healthcare program name (514); healthcare program address (516); private healthcare provider phone number (518); private healthcare provider fax number (520); private healthcare provider e-mail address (522); healthcare program administrator (524); description of healthcare plan (526); optional individual payment amount (528); individual's healthcare history (530) (this information can include information on length of time on private healthcare provider programs and types of other programs the individual is a participant); other phone numbers (532); instructions on how to contact private healthcare provider (534); expiration date of the card (536); private healthcare provider website (538); a chip to link to the private healthcare provider for information on the healthcare program (540); and combinations thereof. Examples of each information type are located earlier in this description.

In alternative embodiments, the method can include the step of creating a contractual relationship between the private healthcare provider and a third party for the benefit of the individual. The method can also include the step of disposing marks on the card. Examples of marks on the card are the private healthcare provider, third parties, service providers and combinations thereof.

The funds can be for a completed authorized benefit. A completed authorized benefit is a service that has been authorized by contract by the private healthcare provider or is a stated item of coverage in a private healthcare provider benefit plan.

FIG. 6 shows an example of a smart card (500).

The method described herein is its preferred embodiment is a direct transaction between the service provider and the private healthcare provider using the smart card to facilitate the transaction. In an alternative embodiment, the smart card is contemplated to provide aid to third parties intermediaries.

These third party intermediaries act as a go between the private healthcare provider programs and the individuals receiving the benefit from a private healthcare provider program. Examples of third party intermediaries are School Meal programs, job placement assistance programs, organizations like Meals on Wheels, and other similar programs.

The smart card would facilitate access to the funds the private healthcare provider gives to the third party intermediaries. The funds in the third party intermediaries' account would be transferred directly to the service provider once private healthcare provider approved services had been rendered.

The smart card would also enable the third party intermediaries to report in a more expedited manner without additional labor. The private healthcare provider presently requires regular reports, both on an individual basis and in aggregate, in order for the third party intermediaries to receive funds. Using the smart card eliminates the need for the third party intermediaries to create the reports because the smart card tracks and reports automatically.

While this invention has been described with emphasis on the preferred embodiments, it should be understood that within the scope of the appended claims the invention might be practiced other than as specifically described herein.

What is claimed is:

1. A method for reducing fraud in a healthcare program consisting of the steps of:

a. registering a service provider with a private healthcare provider and issuing a service provider identification code;

b. registering at least one service or at least one good of the service provider with the private healthcare provider and identifying a claim code for each registered service or registered good;

c. issuing a smart card to an individual related to the healthcare program, wherein the program is associated with a private healthcare provider, wherein the individual has an individual identification code, and wherein the smart card has a smart card identification feature including a biometric identification system to identify the individual;

d. using the smart card to determine if the individual:
   i. is the authorized bearer of the card; and
   ii. is eligible for benefits from the healthcare program;
e. using the smart card to determine if a service provider is preauthorized to provide a registered product or registered service under the healthcare program;
f. using the smart card to facilitate a first transmission from the service provider to the private healthcare provider, wherein the first transmission comprises:
   i. the service provider identification code;
   ii. the individual identification code;
   iii. proposed information selected from the group consisting of proposed product information for the individual; proposed service information for the individual; corresponding claim codes for the proposed product; and corresponding claim codes for the proposed service; and
   iv. a request to confirm:
      1. the individual's eligibility for benefits under the healthcare program;
      2. a validation that the proposed good or service is approved for the individual;
      3. the service provider's eligibility to render services or provide goods under the healthcare program; and
      4. a request to participate in an accelerated payment program for the proposed good or the proposed service;
g. using the smart card to facilitate a second transmission from the private healthcare provider to the service provider, wherein the second transmission comprises:
   i. the individual's eligibility for benefits under the healthcare program;
   ii. a validation that the proposed good or proposed service is approved for the individual;
   iii. a validation of the service provider's eligibility to render services under the healthcare program;
   iv. a confirmation that an accelerated payment program is available; and
   v. an authorization code to provide the proposed product and/or proposed service;
h. using the smart card to facilitate a third transmission from the service provider to the private healthcare provider, wherein the third transmission comprises:
   i. a claim codes list for services rendered;
   ii. acknowledgement by the individual that information on the product and/or service was provided to the individual;
   iii. acknowledgement that the product or service has been received from the service provider; and
   iv. a request for accelerated payment by the private healthcare provider to the service provider; and
i. upon receipt of the third transmission by the private healthcare provider, funds are transmitted from the private healthcare provider to the service provider.

2. The method of claim 1, wherein the second transmission further comprises an alert to the service provider that a portion of the funds may need to come from the individual and an indication of the amount of the funds.

3. The method of claim 1, wherein the third transmission further comprises dollar amount limits for the accelerated payment.

4. The method of claim 1, wherein the third transmission further comprises an acknowledgement that funds were collected from the individual by the service provider.

5. The method of claim 1, further comprising the step of wherein between 1 and 21 days of receipt of the third transmission by the private healthcare provider funds are transmitted from the private healthcare provider to the service provider.

6. The method of claim 1, wherein the healthcare program is a member of the group consisting of Medicare, Medicaid, other federal health programs, and private healthcare provider programs.

7. The method of claim 1, wherein the first transmission further comprises a member of the group consisting of:
   a. a first transmission identification code;
   b. service provider information that comprises a member of the group consisting of
      i. service provider code;
      ii. service provider name;
      iii. service provider address;
      iv. service provider office code; and
      v. service provider phone number;
   c. individual information that comprises a member of the group consisting of:
      i. individual name;
      ii. individual address;
      iii. private healthcare provider phone number;
      iv. individual social security number; and
      v. combinations thereof.

8. The method of claim 1, wherein the second transmission further comprises a member of the group consisting of:
   a. a notice as to further services or goods potentially needed by the individual;
   b. a depiction of the individual; and
   c. a second transmission identification code and combinations thereof.

9. The method of claim 1, wherein the third transmission further comprises a member of the group consisting of:
   a. a tracking number;
   b. a date on which the benefit was rendered;
   c. a total amount charged relative to the individual;
   d. a statement as to any amount that exceeds authorized service or good;
   e. detail on the claim codes for rendered service or good;
   f. a third transmission identification code; and
   g. combinations thereof.

10. The method of claim 1, wherein the smart card is an electronically readable card comprising information selected from the group consisting of:
   a. individual name;
   b. individual address;
   c. individual phone number;
   d. individual fax number;
   e. individual email address;
   f. individual social security number;
   g. healthcare program name;
   h. healthcare program address;
   i. private healthcare provider phone number;
   j. private healthcare provider fax number;
   k. private healthcare provider e-mail address;
   l. healthcare program administrator;
   m. description of private healthcare provider benefit plan;
   n. individual payment amount;
   o. individual's benefit history;
   p. other phone numbers;
   q. instructions on how to contact private healthcare provider;
   r. expiration date of the smart card;

s. private healthcare provider website address;
t. a chip to obtain the information on the healthcare program; and
u. combinations thereof.

11. The method of claim 1, wherein the individual's benefit history includes information on length of time on private healthcare provider programs and types of other programs the individual is eligible to use.

12. The method of claim 1, further comprising the step of creating a contractual relationship between the private healthcare provider and a third party for the benefit of the individual.

13. The method of claim 1, further comprising the step of disposing marks on the card selected from the group consisting of the private healthcare provider trademarks and logos, third party trademarks and logos, service provider trademarks and logos and combinations thereof.

* * * * *